United States Patent Office 3,822,327
Patented July 2, 1974

3,822,327
NEUTRALIZED POLYCONDENSED VINYLPHOSPHONATES
Edward D. Weil, Hastings-on-Hudson, N.Y., assignor to Stauffer Chemical Company, New York, N.Y.
No Drawing. Continuation-in-part of abandoned application Ser. No. 23,493, Mar. 27, 1970. This application June 14, 1971, Ser. No. 153,075
Int. Cl. C07f 9/40; D06c 27/00
U.S. Cl. 260—928        4 Claims

ABSTRACT OF THE DISCLOSURE

The present invention provides a process for flameproofing textiles which comprises applying to the textiles a solution containing a neutralized, polycondensed vinylphosphonate whereupon the neutralized condensate is cured so as to form an insoluble, fire retardant resinous finish characterized by its excellent durability.

RELATED APPLICATION

This application is a continuation-in-part of copending application Ser. No. 23,493, filed Mar. 27, 1970 now abandoned.

BACKGROUND OF THE INVENTION

In the above noted copending application, there is disclosed a process for flameproofing textiles which comprises the application, thereto, of a variety of polycondensed vinylphosphonates of which the idealized formula for the preferred species corresponds to the formula:

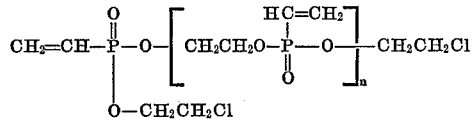

wherein $n$ is a number having a value of from about 1 to 20. The thus applied condensate is then cured, or polymerized, so as to form an insoluble, fire retardant resinous finish.

The above described polycondensed vinylphosphonates can be used to provide a number of different textiles with a fire retardant finishes which are curable under mild conditions without any need for excessive heating or for the use of acid catalysts. However, it has been found that the thus produced fire retardant finishes are often somewhat deficient with respect to their durability upon being laundered or dry cleaned. Thus, upon being subjected to the latter operations, there may be a considerable loss of the resinous finish from the textile substrate with a consequent diminution of its fire retardant properties.

TECHNICAL DISCLOSURE OF THE INVENTION

It has now, surprisingly, been found that substantial improvements in the durability of the fire retardant finishes derived from polycondensed vinylphosphonates having the repeating structural unit:

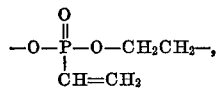

which are originally produced by the condensation polymerization of a monomeric 2-haloethyl vinylphosphonate containing acidic groups, can be obtained by affecting their neutralization by means of a reaction with an effective amount of an epoxide reagent prior to their use as textile finishing reagents.

The thus neutralized polycondensed vinylphosphonate is thereafter applied to a textile substrate and then cured, by an appropriate means, so as to yield an insoluble fire retardant resinous finish characterized by an outstanding degree of resistance to laundering and dry cleaning which is in marked contrast to the durability of the finishes obtained, under identical conditions, with the unneutralized condensates from which these neutralized materials are prepared. As used in this disclosure, the term "vinylphosphonate" is meant to include both alpha-methylvinylphosphonates as well as alpha-unsubstituted vinylphosphonates.

The actual preparation of the neutralized, polycondensed vinylphosphonates used in the textile finishing process of this invention begins with the preparation of the unneutralized, polycondensed vinylphosphonates. This is accomplished by heating a bis(2-haloethyl) vinylphosphonate, preferably, bis(2-chloroethyl) vinylphosphonate, at a temperature sufficient to evolve an ethylene dihalide. The rate of this reaction is improved by conducting it in the presence of catalytic amounts, e.g. from 100 p.p.m. to 5%, of a basic compound which may be a carbonate, bicarbonate or hydroxide of an alkali or alkaline earth metal such, for example, as sodium carbonate, potassium carbonate, lithium carbonate, sodium bicarbonate and calcium hydroxide or any base capable of cleaving the phosphonate ester linkage so as to generate a phosphonate anion. Other effective bases in this system include alkali halides, alkali phosphates, phosphines, quaternary ammonium bases or salts and quaternary phosphonium salts. A polymerization inhibitor such, for example, as hydroquinone or other phenols, may also be present in the system in a concentration of from about 1 to 1,000 p.p.m., by weight, of the vinylphosphonate in order to suppress vinyl-type, i.e. addition, polymerization during the preparation and/or the storage of the resulting condensate.

The condensation reaction is conducted at elevated temperatures in the range of from about 140 to about 250° C., preferably about 160 to 220° C., while removing, usually by means of distillation, the ethylene dihalide, e.g. ethylene dichloride, which is formed as a by-product. The distillation is usually followed by a stripping or sparging of the reaction mixture in order to complete the removal of the ethylene dihalide by-product. The reaction may be terminated when the amount of ethylene dihalide which has been liberated corresponds to the desired degree of condensation, i.e. the number of vinylphosphonate units, in the average polycondensate molecule.

The main course of the above described reaction may be represented by the following idealized equation.

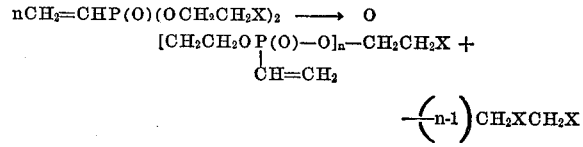

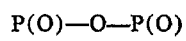

In the above equation, the subscript "$n$" will have a value of from about 1.2 to about 10. However, it is to be understood that is represents an average value since as is true in substantially all condensation polymerizations, a more or less statistical distribution occurs. In this disclosure, "$n$" is hereinafter referred to as the "degree of condensation." In the equation, the symbol "X" designates a halo radical which may be either chloro or bromo. It is to be understood that all references to "halo" groups or radicals in this disclosure are meant to encompass both chloro and bromo groups.

However, it should be stressed that, as prepared by means of the above described reaction procedure, the polycondensed vinylphosphonates are not precisely represented by the above given formula. Thus, these products will contain some residual P(O)OH and

P(O)—O—P(O)

groups which are acidic in nature and whose presence is ascribable to various side reactions which are, for the most part, incompletely understood. Unless the formation of these acidic groups is deliberately enhanced for reasons and by means of procedures described hereinbelow, their presence is quite difficult to control quantitatively. Thus, these acid groups interfere to a substantial degree with the utility of the polycondensed vinylphosphonates. For example, they retard the curing rate when they are utilized in the preparation of polyester resins and impart poor moisture resistance and weathering properties among their other undesirable effects.

The removal of this acidity is now brought about by neutralizing these acidic polycondensates by means of a reaction with a neutralizing amount, i.e. an amount which is at least effective to neutralize substantially all of the acidic groups, of an epoxide reagent, i.e. a reagent having one or more

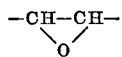

groups on its molecule. Such epoxide reagents include $C_2$–$C_8$ alkylene oxides such as ethylene, propylene, butylene, octylene and styrene oxides, epichlorohydrin, epibromohydrin, glycidol, glycidyl ethers such as the diglycidyl ether of isopropylidenediphenol, butadiene diepoxide, vinylcyclohexene diepoxide, 3,3,3-trichloro-1,2-epoxypropane, and glycidyl esters such as glycidyl methacrylate and glycidyl acrylate. Preferred for use in preparing the fire retardant textile finishes of this invention are the polycondensed vinylphosphonates which have been neutralized by being reacted with ethylene or propylene oxide, epichlorohydrin or the diglycidyl ether of isopropylidenediphenol. The reaction may be run at a temperature of from about 25 to 225° C., preferably at about 50–150° C., over a period of from about 0.1 to 24 hours. The reaction is usually terminated when an analytical determination of the remaining acid groups in the polycondensate reveals that they are present in an insignificant level. Thus, for most practical purposes, an acid number of about 10 mg. KOH/gm., or less, is the equivalent of neutrality. The precise amount of acidity which is considered insignificant will, of course, depend upon the particular use to which the neutralized condensate is to be put. Any unreacted epoxide reagent dissolved in the reaction product may then be removed by purging the system with nitrogen and/or by applying vacuum.

The thus produced neutralized, polycondensed, vinylphosphonates are syrups whose viscosity increases with an increase in their degree of condensation. Although these condensates can be prepared so as to have twenty or more phosphorus atoms per molecule, such products are extremely viscous and are not ordinarily as useful as those wherein there are from about one to about ten phosphorus atoms per molecule since the latter are more conveniently utilized in the textile finishing process of this invention. Thus, the most preferred neutralized polycondensates are those having an average of about 1.2 to 10, and particularly about 1.5 to 6, phosphorus atoms per average polycondensate molecule. A discussion of the theoretical aspects of the neutralization, with epoxide reagents, of polycondensed vinylphosphonates may be found in the article by Kafengauz et al. on page 73 of the April 1967 issue of Soviet Plastics.

It is to be emphasized at this point that the structures of the epoxide neutralized, polycondensed vinylphosphonates utilized in the textile finishing process of this invention are quite difficult to specify by means of precise formulae. Thus, the initial polycondensation reaction involving the bis(2-haloethyl) vinylphosphonate would be expected, in an idealized sense, to run as follows:

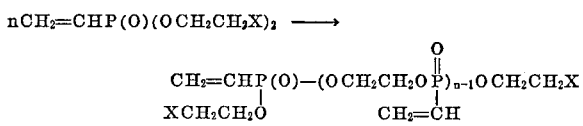

wherein $n$ and X are as previously defined. However, since in actual experiments, acidic groups are found by titration, the above given formula cannot completely represent the product. Thus, titration experiments indicate that P(O)—OH and probably P(O)—O—P(O) groups are present. Thereafter, when the acidic groups are rendered neutral by reaction with an epoxide reagent, further uncertainty occurs in the resultant structure since experiments on simpler model compounds indicate that the reaction between P(O)—OH groups and ethylene oxides, for example, does not only yield

groups but actually also provides

groups wherein $m$ is greater than zero. Further ambiguity occurs where the epoxide reagent is unsymmetrical, as in the case of epichlorohydrin or propylene oxide, since —OCH$_2$CHOHCH$_2$R and/or —OCH(CH$_2$R)CH$_2$OH structures may form; "R" in the latter structures indicating alkyl groups. The fate of the anhydride

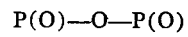

linkages is also not fully understood. Thus, they can lead to P(O)—O—alkylene—O—P(O) or to

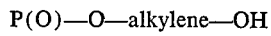

groups since they can be cleaved by the epoxide or by the hydroxyalkyl groups which are present in the reaction mixture. For all of these reasons, it is preferred to describe these neutralized, polycondensed vinylphosphonate in terms of the process by which they are produced.

A small concentration of cyclic glycol phosphonate ester structures, which have acidic properties in the presence of water due to rapid hydrolysis are also believed to be in the reaction mixture. These cyclic ester structures are not believed to react directly with the epoxide used for neutralizing the product, but are believed to slowly react with the hydroxyalkyl groups engendered by the epoxide phosphonic acid reaction to form neutral noncyclic esters. The cyclic esters can also be reduced in concentration by adding an alcohol such as methanol before the epoxide reaction step in order to open these cyclic esters to form neutral noncyclic esters. This optional step of adding an alcohol to open the cyclic esters does not elminate the other acidic groups. Thus, the products derived from reaction mixtures to which an alcohol has been added are meant to be included in the class herein described as "acidic polycondensed vinylphosphonates" which are subsequently subjected to the epoxide treatment which is the subject of the present invention.

A portion of the acidity, in the form of P(O)OH groups, which is present in the polyphosphonates prior to their neutralization, is believed to be due to the presence of residual bis(2-haloethyl) 2-haloethylphosphonate, e.g. bis(2-chloroethyl) 2-haloethylphosphonate, which is the intermediate commonly used in preparing the bis(2-haloethyl) vinylphosphonates from which the condensates are, in turn, prepared (see Sorstokke and Stamm, U.S. Pat. 3,548,040). Accordingly, it may sometimes be desired to prepare these neutralized condensates for use in the textile finishing process of this invention so that they have a high hydroxyalkyl content which is often useful where they are to be employed as coreactants with certain types of reagents such, for example, as aminoplasts and isocyanates, or to improve their water solubility. This may be accomplished by deliberately admixing a quantity of a bis(2-haloethyl) 2-haloethylphosphonate with the bis(2-haloethyl) vinylphosphonate prior to the above described condensation reaction. Under these conditions the 2-haloethylphosphonate is believed to undergo thermal dehydrohalogenation in situ to form a vinylphosphonate.

Thus, for each mole of the bis(2-haloethyl) phosphonate which is added to the system in this manner, the resulting condensate will contain one molar equivalent of P(O)OH or P(O)—O—P(O) groups which will, in turn, provide for about one mole of hydroxyalkyl groups in the neutralized condensate resulting from the process of this reaction. With respect to proportions, this embodiment of the process for preparing these neutralized polycondensates may be carried out by the addition of the bis(2-haloethyl) 2-haloethyl phosphonate in an amount of from 0.1% up to about 100%, by weight, of the bis(2-haloethyl) phosphonate depending upon the hydroxyalkyl content which is desired in the neutralized condensate. Moreover, one may, if desired conduct a process in which the bis(2-haloethyl) 2-haloalkyl phosphonate is condensed in the complete absence of any bis(2-haloethyl) vinylphosphonate whereupon the resulting condensate is then neutralized in a reaction with an epoxide reagent in the manner described hereinabove.

Another method for deliberately increasing the

PO(OH)

content of the acidic polycondensates and, consequently, the hydroxyalkyl content of the neutralized products derived therefrom, involves introducing some water or a quantity of an inorganic acidic reagent such as a hydrogen halide, e.g. HCl or HBr, phosphorus pentoxide or phosphoric acid in an amount equivalent to the desired acidic group content either before, during or after the polycondensation reaction.

Under the polycondensation conditions described above, a further elaboration of the polycondensation is possible wherein the (2-haloethyl) vinyl phosphonate and/or its halohalide adduct precursor, i.e. 2-(haloethyl) 2-haloethylphosphonate, is condensed with at least one compound of the structure ROP(=O)XY where R is alkyl, halogenated alkyl and preferably methyl, ethyl, or 2-chloroethyl, and X and Y are RO- or non-interfering radicals selected from the group consisting of alkyl, alkenyl, alkoxy, alkenyloxy, aryl, aryloxy, amino, alkyl- or aryl-substituted amino, or alkylene or alkylene bonded to same or to another ROP(=O) moiety, any of which groups can bear non-interfering substituents such as alkoxy, cyano, carbalkoxy or carbamide. A homopolycondensation giving ethylenedihalide and a copolycondensation giving R-halide as co-products can, of course, be run either simultaneously or consecutively thus allowing for many variations in product composition.

Typical examples of reactions of the copolycondensation type are:

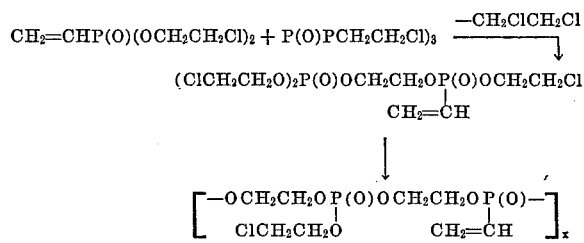

where $x$ can have a value of about 2 to about 20. and

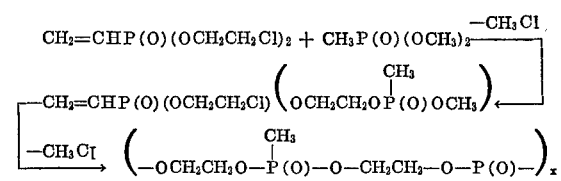

where, by having an exact 1:1 reactant ratio and running the reaction to completion, a high polymer can be obtained.

As prepared by means of the above described procedures, these neutralized, polycondensed vinylphosphonates are soluble in many organic solvents as well as in water. Thus, while the use of aqueous solutions comprises the most economical means of application for these flame retardants, they may also, if desired, be applied to a textile substrate while dissolved in any of the organic solvents commonly used in the solvent finishing of textiles including, for example, trichloroethylene, dichloroethane, trichloroethane, perchloroethylene, methylene chloride, etc. and mixtures thereof.

The solutions, either aqueous or organic solvent, containing the selected neutralized condensates may be applied to textiles by the use of any desired procedure. It is merely necessary to have the neutralized condensate evenly absorbed throughout the mass of the textile and/or to apply it to at least one surface thereof by means of any convenient procedure. Thus, they may be applied by being sprayed or printed onto one or both surfaces of the textile or, as is more frequently the case, the textile may be passed or padded through the solution while the latter is being held in a tank or other suitable container. Such a process is commonly referred to as a "padding" technique with the solution being referred to as a "padding bath" or "padding solution."

The concentration of the neutralized, polycondensed vinylphosphonate within the padding bath, or other applicable solution, will be dependent upon a number of factors including the nature of the fibers which comprise the textile, the weight and weave of the textile, the degree of flameproofing that is desired in the finished textile, as well as other technical and economic considerations known and understood by those skilled in the art. However, it is generally desirable that the "dry add-on," i.e. the final amount of the resin finish on the textile, should be in the range of from about 5 to 50%, as calculated on the dry weight of the untreated textile. This range of dry add-on will, in turn, provide the thus treated textile with about 0.5 to 10%, preferably about 1–5%, of phosphorus as based upon the dry weight of the untreated textile. Again, it is to be stressed the latter limits are merely illustrative and may be varied so as to provide a textile finish having any desired degree of flame retardancy.

The thus applied neutralized condensate may be cured in the wet state or it may be completely or, most preferably, partially dried before curing. The mode of curing in accordance with the process of the invention preferably involves the use of a free radical initiated reaction in order to induce the double bonds, i.e. the ethylenic unsaturation, of the vinyl groups present in these compounds to polymerize intermolecularly so as to form a crosslinked, insoluble resin in and/or on the individual fibers which comprise the textile substrate. In this curing reaction, the vinyl groups in the condensate may react with each other and/or with the cellulose. In the latter case, the reaction may be described as "grafting."

Free radical initiation of the desired polymerization reaction may be induced either by the use of those chemical catalysts known as free radical initiators and/or by the use of the actinic radiation. Suitable free radical catalysts encompass azo compounds as well as peroxygen compounds. The latter catalysts may be used as part of a so-called redox system containing a chemical reducing agent such as ascorbic acid, a bisulfite or a ferrous salt, etc., in addition to the peroxygen compound. An example of a suitable peroxygen catalyst is hydrogen peroxide, which is often used in a concentration of from about 0.01 to 5%, by weight, of the neutralized, polycondensed vinylphosphonate. Where especially rapid catalysis is desired, the use of a redox system, comprising a peroxygen catalyst in combination with one of the above described reducing agents is recommended. These two components of the redox system may be applied to the textile substrate in separate operations in order to prevent premature cure.

Actinic radiation encompasses high energy protons and other particles capable of initiating free radical reactions including ultraviolet light, X-rays, gamma rays, alpha rays, beta rays, i.e. electron beam radiation, and plasma, i.e. a highly ionized gas as obtained, for example, in corona discharges from a high voltage terminal. A preferred source of actinic radiation involves the use of an electron beam, i.e. beta radiation, since equipment adaptable for textile mill use is readily available and is eminently suited for rapid, continuous processing. In any event, regardless of the type of actinic radiation that is used, it should be applied in a dosage which is sufficient to initiate polymerization. Thus, in the case of electron beam radiation, suitable dosages are typically in the range of 0.1–10 megarads.

Where a cure is induced by the use of a free radical catalyst, the selected catalyst may be conveniently activated by heating up to about 180° C. but, preferably in the range of from about 60 to 160° C. so as to avoid any thermal damage to the textile. Heating may, if desired, be accomplished by the use of steam or hot gases. Alternatively, the catalyst can be activated by applying a reducing agent of the type described herein above to the cloth either before or after aplying the flame retardant and catalyst. The catalyst may also be activated by actinic radiation.

Generally, the rate of cure of a catalytically initiated cure is adversely influenced by the presence of atmospheric oxygen. Therefore, for an optimum cure rate, it is advantageous to exclude oxygen by use of an inert gas which can be steam, nitrogen, carbon dioxide or the like. A particularly convenient means for accomplishing this effect is to conduct the final drying of the finish at the cure temperature so that the steam being evolved forms an air-excluding blanket. In the textile mill this is easily accomplished by passing the treated textile from the padder over heated metal cylinders or "cans" at such a rate and temperature as to initiate curing while some moisture still remains.

When actinic radiation is used, either alone or in combination with a free radical catalyst, it is only necessary to expose the textile to a beam from a radiation source. If desired, this can be done at ambient temperatures and with great rapidity, e.g. from about 0.1 seconds to several minutes, thus sparing the textile from thermal damage. A further advantage of radiation curing is the fact that since catalysts and heating are not required, the textile is generally found not to have undergone any serious degradation of its physical properties such as color, tear strength, and abrasion resistance. In addition, a radition induced cure is generally not as seriously affected by the presence of oxygen in the system as is a chemically induced cure. Moreover, it has been found that by using radiation to affect the cure, the resulting finish will be tightly cured, i.e. extensively crosslinked, so as to provide it with greater durability to laundering and dry cleaning.

The exposure to actinic radiation can be conveniently conducted by passing the textile through the beam which may be produced, for example, by a bank of ultraviolet lamps, corona-discharge points, a cobalt-60 source, an X-ray source or an electron beam source. Reasonably homogeneous radiation flux is desirable where an electron beam is used. Thus, the beam can be transversely scanned across the textile at a rapid rate so as to evenly irradiate all points thereon. If desired, a suitable mechanical arrangement of rollers can be employed so that the treated textile can be made to repeatedly pass through the radiation field, thereby facilitating more complete use of the available radiation flux while also obtaining more uniform irradiation.

The use of actinic radiation initiation does not generally require the use of a chemical activator. However, the efficiency of the radiation can frequently be improved by use of such an activator. Suitable activators for this purpose include ketones, such as acetone or benzoin; polycyclic hydrocarbons, such as polyphenyl; and, azo compounds such as azobisisobutyronitrile. Where an electron beam is used, the application of about 0.1–10 megarads generally suffices to affect the desired cure.

The resulting cure, or polymerization, of the neutralized, polycondensed vinylphosphonate which is induced by either a catalyst and/or actinic radiation generally takes place on the surface of the individual fibers which comprise the textile substrate. However, where the fiber is one which can readily absorb the neutralized condensate such, for example, as the cellulosic fibers, the polymerization can also take place within the body of the fibers. Moreover, as has been noted, in some cases the resulting polymer network may be grafted, or chemically bonded, onto the textile fiber molecules. However, such grafting is not crucial to the attainment of a durable, flame retardant finish.

The irradiation of the textile is usually carried out subsequent to the application of the neutralized condensate, although in the case of cellulosic fibers which can be irradiated so as to form stable, long lived free radical sites, the neutralized condensate can be applied subsequent to irradiation whereupon it will proceed to cure by grafting onto the cellulose.

An advantage of the products resulting from the reaction of epoxides with the acidic vinylphosphonate polycondensation products is that these products contain alcoholic OH groups. The presence of these groups makes possible modes of curing in place of or in addition to curing by means of free radical polymerization of the vinyl groups. Thus, these reaction products may be cured by polyfunctional reagents capable of reacting with the alcoholic OH groups, examples of such reagents being di- or polyisocyanates and anhydrides of dibasic or polybasic acids. Moreover, where the alcoholic OH groups are primary, as in the case where the epoxide employed is ethylene oxide, curing may be effected with polymethylolated amino compounds such as dimethylolurea, di- or polymethylol melamine, dimethyloluron or dimethoxymethyluron, dimethylolidhydroxy and ethyleneurea. Where the sole means of curing is to be by the use of such a chemical reaction of the primary alcoholic OH group with a methylol amino compound, the use of dimethyloldihydroxy ethyleneurea is highly preferred for this purpose.

A further means of curing these products involves addition reactions, with compounds having more than one NH group, to the double bonds of the vinylphosphonate structures. Thus, these products may be cured by reaction with ammonia, primary amines, and polyamines of the type commonly used to cure epoxy resins, including dicyandiamide and guanidine. The epoxide-neutralized products have an advantage, in this respect, over the precursor acidic polycondensed vinylphosphonates in that amine curing agents do not form useless and undesirable salts with these epoxide-neutralized products.

The process of this invention may, if desired, include the use of other free radical curable, i.e. polymerizable, comonomers along with the selected neutralized, polycondensed vinylphosphonate as a means of achieving variations in the properties of the resulting treated textiles. The thus added optional comonomers form copolymers with the neutralized condensate during the curing, or polymerization of the condensate. Suitable comonomers for use in conjunction with the neutralized condensate include:

(1) Monomers containing an amide nitrogen such as acrylamide, methacrylamide, N-methylolacrylamide, N-methylolmethacrylamide, diacetonylacrylamide, methylene bisacrylamide, triacryloylhexahydrotriazine, N - vinylpyrrolidone and cellulose-grafted N-methylolacrylamide, the use of the latter monomer being disclosed in U.S. Pat. 3,434,161. The use of these amide nitrogen containing comonomers at a concentration of up to about 6 molecules per each vinyl group of the neutralized condensate, permits a more economical finish, particularly with cellulosic fibers, since less of the more costly phosphonate monomer needs to be used in order to achieve a given level of flame retardancy. From the latter group of monomers, the use of acrylamide is preferred.

(2) Monomers containing more than one polymerizable double bond such, for example, as the glycol diacrylates, the glycol dimethacrylates, methylene bisacrylamide, triacryloylhexahydrotriazine, triallyl phosphate, dialkyl allylphosphonate and triallyl cyanurate. By using this class of comonomers, the crosslink density of the resulting finish can be increased, thereby enhancing its durability with respect to wear and laundering.

(3) Monomers contributing to flame retardancy, i.e. monomers having phosphorus, bromine or chlorine atoms in their molecules including, for example, vinyl and vinylidene halides such as vinyl chloride, vinyl bromide, vinylidene chloride, vinylidene bromide, vinylidene chlorobromide and chloroprene; triallyl phosphate; diallylphosphonate; dialkyl vinylphosphonates such as diethyl vinylphosphonate bis(2-chloroethyl) vinylphosphonate or its polycondensation products; and, in general all of the unsaturated phosphonate monomers disclosed in my copending applications Ser. Nos. 23,493 and 23,499 both filed Mar. 24, 1970.

(4) Monomers contributing to surface quality, i.e. "hand," softness, flexibility, smoothness of tactile quality, gloss, and abrasion resistance, for example hydroxyalkyl acrylates or methacrylates, alkoxyalkyl acrylates or methacrylates, long-chain alkyl acrylates or methacrylates, vinyl long-chain alkyl acrylates or methacrylates, vinyl long-chain alkyl ethers, vinyl esters of fatty acids or fluorinated akanoic acids, or the like.

When utilized in the process of this invention, the above described optional comonomers can be present in the system in an amount of up to about 6 molecules per each vinyl group of the required neutralized, polycondensed vinylphosphonate.

It should be noted, at this point, that the use of the term "crosslinked" in describing the cured, fire retardant resins resulting from the polymerization of the selected neutralized polycondensed vinylphosphonate in the textile finishing process of this invention will indicate to those skilled in the art that these resins possess a three-dimensional configuration or network rather than a simple linear or branched structure of the type found in non-crosslinked copolymers. Thus, such cross-linked polymers may be further characterized by the fact that they will not lose more than about 20% of their total weight upon being extracted with methanol in a Soxlet extractor. Moreover, as used in this disclosure, the term "fire retardant" is intended to refer to that particular property of a material which provides it with a degree of resistance to ignition and burning. Thus, a fire or flame retardant textile is one which has a low level of flammability and flame spread. This property may be conveniently evaluated by means of any of the standard flame retardancy tests such, for example, as the so-called vertical char length flame test described in AATCC (American Association of Textile Chemists and Colorists) 34–1966.

The textile finishing process of this invention is compatible with a wide variety of other textile finishing operations which can be carried out prior, simultaneous with, or subsequent to the process of this invention. These other operations include application of durable press, softening, anti-static, abrasion resistance, water-repellent, soil-release and antimicrobial finishes as well as bleaching, dyeing, printing, flocking, and texturing. Thus, the finishing formulations of this invention may also optionally contain other types of ingredients known in the textile fiinshing art. For example, water and soil repellents, optical brighteners and colorants, softening agents such as polyethylene emulsions, hand-modifying agents, buffering agents, pH-controlling agents which may be acidic or basic, emulsified waxes, chlorinated paraffins, polyvinyl chloride, polyvinylidene chloride, homo- and copolymers of the alkyl acrylates and other resinous finishing agents may be added in conjunction with the finishing agents of this invention. And, where an extremely high degree of flame retardance is required, it is possible to employ systems containing antimony oxide and a resinous binder, particularly one containing chlorine, such as a chlorinated paraffin or polyvinyl chloride, along with the neutralized, polycondensed vinylphosphonates required in the process of this invention.

All types of textiles may be treated by means of the process of this invention so as to provide them with durable, fire retardant finishes. Thus, one may treat textiles derived from natural fibers such as cotton, wool, silk, sisal, jute, hemp and linen and from synthetic fibers including nylon and other polyamides; polyolefins such as polypropylene; polyesters such as polyethylene terephthalate; cellulosics such as rayon, cellulose acetate and triacetate; fiber glass; acrylics and modacrylics, i.e. fibers based on acrylonitrile copolymers; saran fibers, i.e. fibers based on vinylidene chloride copolymers; nytril fibers, i.e. fibers based on vinylidene dinitrile copolymers; rubber based fibers; spandex fibers, i.e. fibers based on a segmented polyurethane; vinal fibers, i.e. fibers based on vinyl alcohol copolymers; vinyon fibers, i.e. fibers based on vinyl chloride copolymers; and, metallic fibers. Textiles derived from blends of any of the above listed natural and/or synthetic fibers may also be treated by means of the process of this invention.

As used in this disclosure, the term "textile" or "textiles" is meant to encompass woven or knitted fabrics as well as non-woven fabrics which consist of continuous or discontinuous fibers bonded so as to form a fabric by mechanical entanglement, thermal interfiber bonding or by the use of adhesive or bonding substances. Such non-woven fabrics may contain as much as 100% of wood pulp as well as conventional textile fibers in which case part of the bonding process is achieved by means of hydrogen bonding between the cellulosic pulp fibers. In non-woven fabrics, the finishing agents of this invention can function not only as flame retardant finishes but can also contribute to the interfiber bonding resin component. This dual role can also be played by the finishing agents of this invention in fabric laminates where the finishing agent can at the same time serve as the interlaminar bonding agent and as the flame retardant. In both of these systems, i.e. non-woven fabrics and laminated fabrics, the finishing agents of this invention can also be blended with the usual bonding agents such, for example, as acrylic emulsion polymers, vinyl acetate homo- and copolymer emulsions, styrene-butadiene rubber emulsions, urethane resin emulsions, polyvinyl chloride emulsions, vinyl chloride-alkyl acrylate copolymer emulsions, polyacrylates modified by vinyl carboxylic acid comonomers and the like.

It should also be noted, at this point, that in addition to being used to provide flame retardant finishes for textiles, the above described neutralized, polycondensed vinylphosphonates can be used for flameproofing a variety of otherwise flammable polymeric substrates such as cellulose in the form of paper, wood, plywood, chipboard, jute, batting and the like; urethane foams, coatings, and elastomers; aminoplast resins and phenolic resins as well as their composites with paper, wood flour and the like; alkyd coatings and molding resins; and, paints and varnishes derived from natural or synthetic resins.

The following examples will further illustrate the embodiment of this invention. In these examples all parts given are by weight unless otherwise noted.

EXAMPLE I

This example illustrates the preparation of a neutralized vinyl polyphosphonate suitable for use in preparing durable, fire retardant textile finishes by means of the process of this invention.

Part A

A total of 8 moles (1864 gms.) of bis(2-chlorovinyl) vinylphosphonate, 8 gms. of sodium carbonate and 0.2 gms. of t-butylhydroguinone are heated at a temperature of 170–185° C. for 3 hours and then sparged with nitrogen gas until a total of 475 gms. of ethylene dichloride has been distilled off. This corresponds to the formation of a condensation product having the idealized average formula:

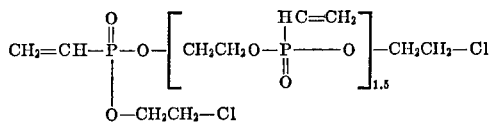

On titration to a Congo red end point, this condensate is found to have an acid number of 70 mg. KOH/gm. which indicates that a substantial number of acidic groups are present in the product.

Part B

The above described condensate is then neutralized by the passage of about 50 gms. of ethylene oxide into this product over a period of 4 hours while the system is at a temperature of 120–125° C. The system is then sparged with nitrogen to remove dissolved, unreacted ethylene oxide. The thus neutralized condensate is a light yellow syrup having an acid number less than 5 mg. KOH/gm., and containing 17.8% P.

EXAMPLE II

This example illustrates the preparation of a durable, fire retardant textile finish with a neutralized, polycondensed vinylphosphonate by means of the novel process of this invention. It also provides a comparison with the results obtained, under identical conditions, using the unneutralized condensate from which the neutralized material is prepared.

A series of four 3″ x 10″ samples of a white polyester:cotton (65:35) cloth having a weight of 2.6 oz./sq. yd. are padded with the four different solutions whose compositions are set forth in Table I, hereinbelow. The thus treated cloths are then dried and cured at 160° C. for a period of 3 minutes. The color of the treated cloths is noted whereupon their flammability is then evaluated by means of the vertical char length test, as described in AATCC 34—1966, in which a strip of the finished cloth is suspended in its vertical dimension so that its lower edge is maintained ¾″ above the top of a Bunsen burner having a 1.5″ high flame for a period of 12 seconds. The length of the resulting char is then measured. Thus, a shorter char length of about 5 to 7 inches is indicative of a greater degree of fire retardancy while a char length of longer than about 10 inches is unacceptable for most applications.

The char length test procedure is then repeated upon four additional samples of the treated cloth which, in this instance, have been subjected to a series of five detergent washes. A comparison of the char lengths obtained with the various finished cloths before and after the five detergent washings thus serves to provide an evaluation of their durability. Table II, hereinbelow, provides the data obtained in these evaluations.

TABLE I.—CONTENTS OF PADDING BATHS

|  | Percent solids in bath | | | |
| --- | --- | --- | --- | --- |
|  | No. 1 | No. 2 | No. 3 | No. 4 |
| The acid condensate whose preparation is described in Part A of Example I | 40 | 40 | | |
| The neutralized condensate whose preparation is described in Part B of Example I | | | 40 | 40 |
| Acrylamide (comonomer) | 15 | 30 | 15 | 30 |
| Urea (buffer) | 5 | 5 | 5 | 5 |
| Potassium persulfate (catalyst) | 1 | 1 | 1 | 1 |
| Octyl phenoxypolyethyleneoxy ethanol (wetting agent) | 0.4 | 0.4 | 0.4 | 0.4 |
| Water | 38.96 | 23.96 | 38.96 | 23.96 |

TABLE II.—EVALUATION RESULTS

|  | Fabric treated in bath | | | |
| --- | --- | --- | --- | --- |
|  | No. 1 | No. 2 | No. 3 | No. 4 |
| Percent dry add-on of finish on dry wt. of cloth | 42.8 | 52 | 44.6 | 52. |
| Color | Tan | Lt. tan | Lt. tan | White. |
| Char length before wash (inches) | 3 | 4.3 | 4.8 | |
| Char length after wash (inches) | BEL* | BEL | 5.5 | 5.5. |

*BEL=Burned over its entire length.

The above data clearly indicate that the fire retardant finishes prepared from the neutralized polycondensed vinylphosphonates whose use is required in the process of this invention are substantially more durable than the finishes prepared from the unneutralized condensates.

EXAMPLE III

This example again illustrates the preparation of flame retardant textile finishes with neutralized polycondensed vinylphosphonates.

Padding baths having the compositions described the following table are prepared:

|  | Percent solids in bath | | | |
| --- | --- | --- | --- | --- |
|  | No. 1 | No. 2 | No. 3 | No. 4 |
| A polycondensed bis(2-chloroethyl) vinylphosphonate containing 18.4% P having a degree of condensation of 2.8, which has been neutralized with ethylene oxide to an acid number of 1.5 mg. KOH/gm | 15 | 15 | 15 | |
| The above described condensate but in unneutralized form and having an acid number of 56 mg. KOH/gm | | | | 15 |
| Acrylamide (comonomer) | 11.25 | 11.25 | 11.25 | 11.25 |
| Octyl phenoxypolyethylene ethanol (wetting agent) | 0.05 | 0.05 | 0.05 | 0.05 |
| Potassium persulfate (catalyst) | 1 | 1 | 1 | 1 |
| Urea (buffer) | 5 | | | |
| Sodium bicarbonate (buffer) | | 5 | 5 | 5 |
| Water | 17.70 | 17.70 | 17.70 | 17.70 |

Polyethylene cloth swatches are padded in these baths, dried in air and then cured in a steam press at 330° F. for 3 minutes The samples are then subjected to an accelerated laundring by being boiled for one hour with an aqueous solution containing 0.5% Na₂CO₃ and 0.2% of soap.

The cloths treated in baths Nos. 1–3, which contain neutralized condensate, are found to be non-burning under the conditions of ASTM D-2863 while the cloths treated in bath No. 4, which contains the unneutralized condensate, burn in air under these same conditions.

EXAMPLE IV

This example illustrates the preparation of a series of ethylene oxide neutralized, polycondensed vinylphosphonates having different degrees of condensation and also demonstrates their use for the flameproofing of textiles.

Part A

A mixture of 22,350 gms. of bis(2-chloroethyl) vinylphosphonate (the crude product resulting from thermal rearrangement of tris-2-chloroethyl phosphate), 48 gms. of sodium carbonate and 1 gm. of di-tert-butylhydroquinone is heated at 180–185° C. over six hours until 5,555 gms. of ethylene dichloride is distilled off. The reaction mixture is then cooled to 122–126° C. and 1,050 gms. of ethylene oxide is passed in. Previous to the introduction of the ethylene oxide, the acidity of the batch is found, by titration of a small sample to a bromophenol blue end point with 0.1 N NaOH, to be 1.14 milliequivalents per gram. After the ethylene oxide treatment, the acidity found by means of this analysis is nil. The small amount of unreacted, i.e. excess, ethylene oxide remaining at the completion of the reaction is removed by sparging with nitrogen. The product is a pale yellowish liquid containing 17.4% P which corresponds to a degree of condensation of about 2.4.

By controlling the percentage of ethylene dichloride which is formed and distilled out from the reaction mass, two analogous products are prepared, one containing 16.05% P and having an average degree of condensation of 1.8, and the other containing 18.7% and having an average degree of condensation of 3.0.

Part B

Swatches of cotton fabric having a weight of 3.2 oz./yd.[2] are added in three baths each of which contains one of the three condensates whose preparation is described in Part A hereinabove. The treated swatches are air dried for 15 minutes and then cured by passage, for 5 minutes, over a rotating can which is at a temperature of 280–300° F. The flammability of the thus treated cloths is evaluated before and after 5 detergent washes by determining their Limiting Oxygen Index (LOI) by means of the procedure described by Fenimore and Martin in the November 1966, issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy with a value of about 26–27 being considered a commercially useful degree of flame retardancy.

The following table presents the result of this evaluation.

|  | Percent solids in bath | | |
| --- | --- | --- | --- |
|  | No. 1 | No. 2 | No. 3 |
| Neutralized condensate having a degree of condensation of 1.8 and containing 16.05% P | 22 |  |  |
| Neutralized condensate having a degree of condensation of 2.4 and containing 17.4% P |  | 22 |  |
| Neutralized condensate having a degree of condensation of 3.0 and containing 18.7% P |  |  | 22 |
| Acrylamide (comonomer) | 15 | 15 |  |
| Octyl phenoxy polyethyleneoxy ethanol (wetting agent) | 0.4 | 0.4 | 0.4 |
| Potassium persulfate (catalyst) | 0.5 | 0.5 | 0.5 |
| Percent dry add-on | 26.9 | 27 | 26.6 |
| LOI before washing | 32.2 | 31.2 | 31.2 |
| LOI after 5 washings | 27.4 | 28.3 | 29.3 |

EXAMPLE V

This example illustrates the preparation of a number of additional neutralized, polycondensed vinylphosphonates and their use in the preparation of fire retardant textile finishes.

Part A

The preparative procedure of Part A of Example I, hereinabove, is repeated with the exception, in this instance, that 70 gms. of propylene oxide is used in carrying out the neutralization reaction by being fed into the system by means of a tube beneath the liquid surface. This neutralization is carried out at 125–135° C. over a 2 hour period whereupon the system is held at 125–135° C. for one hour and then sparged with nitrogen to remove excess propylene oxide. The resulting neutralized condensate is a pale yellow syrup having an acid number of less than 5 mg. KOH/gm.

When 22 parts of this product are substituted for the condensate used in Bath No. 1 of Example IV, hereinabove, cotton cloths which are padded in this bath are found to have excellent flame retardancy properties both before and five detergent washes when evaluated by means of the LOI procedure.

Part B

The preparative procedure of Part A of Example IV hereinabove, is repeated with the exception, in this instance, that 300 gms. of "Epon 828," which is sold by the Shell Chemical Company and which mainly comprises the diglycidyl ether of isopropylidenediphenol, is used in carrying out the neutralization reaction which is carred out at a temperature of 130° C. over a three hour period. The resulting product is a pale yellow syrup having an acid number below 10 mg. KOH/gm.

When 22 parts of this product are substituted for the condensate used in Bath No. 1 of Example IV, hereinabove, cotton cloths which are padded in this bath are found to have excellent flame retardancy properties both before and five detergent washes when evaluated by means of the LOI procedure.

Part C

The following procedure describes the preparation of an ethylene oxide neutralized, polycondensed bis(2-chloroethyl) vinylphosphonate of high hydroxyalkyl content by the addition of bis(2-chloroethyl) 2-chloroethylphosphonate to the system prior to the condensation reaction.

A mixture of 932 gms. (4 moles) of bis(2-chloroethyl) vinylphosphonate, 537 gms. (2 moles) of bis(2-chloroethyl) 2-chloroethylphosphonate, 5 gms. of sodium carbonate, and 1 gm. of di-tert-butylhydroquinone is heated at 180–200° C. over 10 hours with nitrogen purging for the last 1 hour in order to remove a total of 660 grams of ethylene dichloride (6.7 moles). The acidity of the product at this point is 3.3 milliequivalents per gram (Acid No.=185 mg. KOH/gm.). Ethylene oxide is then passed in at 110–125° C. until the product is neutral to bromophenol blue indicator. The hydroxyalkyl content of this product is determined by the standard acetylation technique indicating a hydroxy number of 91.6 mg. KOH/gm.

When 22 parts of this product together with 15 parts of N-methylolacrylamide are substituted for the condensate and the acrylamide used in Bath No. 1 of Example IV, hereinabove, cotton cloths which are padded in this bath are found to have excellent flame retardancy properties both before and five detergent washes when evaluated by means of the LOI procedure.

Part D

The following procedure describes the preparation of a propylene oxide neutralized co-polycondensate of 2-chloroethyl vinylphosphonate and tris-(2-chloroethyl) phosphate.

A total of 0.54 moles (145.3 gms.) of bis(2-chloroethyl) vinylphosphonate is heated at 210–216° C. until 0.54 moles of ethylene dichloride is evolved. This product is shown, by titration of a small sample with NaOH, to be mainly the 2-chloroethyl monoester of vinylphosphonic acid. This intermediate is then heated with 1.79 moles (513 gms.) of tris(2-chloroethyl) phosphate and 3 gms. of sodium carbonate at 183–190° C. until 2.14 moles (211.7 gms.) of ethylene dichloride is evolved. The resultant product is found, by titration of a small sample, to contain 0.7 moles of acid. In order to neutralize this acidic product, 50 gms. (0.86 moles) of propylene oxide, which represents a small excess over the theoretical, is added, with stirring, at 120–125° C. over a one hour period. The thus produced product is a light yellowish syrup which is found to be neutral upon titration with NaOH using bromophenol blue as an indicator.

Analysis.—Found: P, 15.6%; Cl, 16.5%; Hydroxy number=49 mg. KOH/gm. Acid No.=less than 0.1 mg. KOH/gm.

When 22 parts of this product are substituted for the condensate used in Bath No. 1 of Example IV, hereinabove, cotton cloths which are padded in this bath are found to have excellent flame retardancy properties both before and five detergent washes were evaluated by means of the LOI procedure.

Variations may be made in proportions, procedures and materials without departing from the scope of this invention as defined in the following claims.

What is claimed is:

1. A padding bath comprising a solution of at least one neutralized, polycondensed vinylphosphonate, said neutralized, polycondensed vinylphosphonate comprising the substantially neutral product resulting from the reaction at about 25° to 225° C. between a neutralizing amount of an epoxide reagent selected from the group consisting of $C_2$-$C_8$ alkylene oxides, styrene oxide, epichlorohydrin, epibromohydrin, glycidol, diglycidyl ether of isopropylidenediphenol, butadiene diepoxide, vinylcyclohexene diepoxide, 3,3,3-trichloro-1,2-epoxypropane, glycidyl methacrylate and glycidyl acrylate, and an acidic polycondensed vinyl phosphonate having as its repeating structural unit the group:

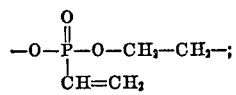

said acidic, polycondensed vinylphosphonate resulting from the heating of a monomeric bis(2-haloethyl)vinylphosphonate so as to effect its condensation polymerization to a polycondensed vinylphosphonate having from about 1.2 to 10 phosphorus atoms per average polycondensed molecule.

2. The padding bath of claim 1 wherein the monomeric bis(2-haloethyl) vinylphosphonate is heated at a temperature from about 140° C. to 250° C. to effect its condensation polymerization.

3. The padding bath of claim 1, wherein the epoxide reagent which has been reacted with said polycondensed, vinylphosphonate is selected from the group consisting of ethylene oxide, propylene oxide, epichlorohydrin and the diglycidyl ether of isopropylidenediphenol.

4. The padding bath of claim 1, wherein said acidic, polycondensed, vinylphosphonate is prepared by the condensation polymerization of bis(2-chloroethyl) vinylphosphonate.

References Cited
FOREIGN PATENTS
202,126  11/1967  U.S.S.R. _____ 260—928

ANTON H. SUTTO, Primary Examiner

U.S. Cl. X.R.
117—136, 93.3, 138.8 R; 260—987

UNITED STATES PATENT OFFICE
CERTIFICATE OF CORRECTION

PO-1050
(5/69)

Patent No. 3,822,327      Dated July 2, 1974

Inventor(s) Edward D. Weil

It is certified that error appears in the above-identified patent and that said Letters Patent are hereby corrected as shown below:

Errors to be listed:

Col. 5, line 55, change "P(O)PCH$_2$CH$_2$CL)$_3$" to --P(O)(OCH$_2$CH$_2$Cl)$_3$ Col. 5, line 71, change "-CH$_3$Cl" to --CH$_3$Cl--;

Col. 5, line 71, change "(-OCH$_2$CH$_2$O-P(O)-O-CH$_2$CH$_2$-O-P(O))$_x$" with CH$_3$ substituent to --(-OCH$_2$CH$_2$OP(O)-O-CH$_2$CH$_2$-O-P(O))$_x$-- with CH$_3$ and CH=CH$_2$ substituents;

Col. 7, line 25, change "aplying" to --applying--;

Col. 12, line 37, next to "Water" in the Table change each occurrence of "17.70" to --67.70--;

Col. 12, line 42, change "3 minutes" to --3 minutes.--;

Col. 12, line 43, change "laundring" to --laundering--;

Col. 13, line 67, and Col. 14, lines 9, 39 and 70, insert --after-- before "five".

Signed and sealed this 18th day of February 1975.

(SEAL)
Attest:

RUTH C. MASON
Attesting Officer

C. MARSHALL DANN
Commissioner of Patents
and Trademarks